United States Patent Office 3,282,178
Patented Nov. 1, 1966

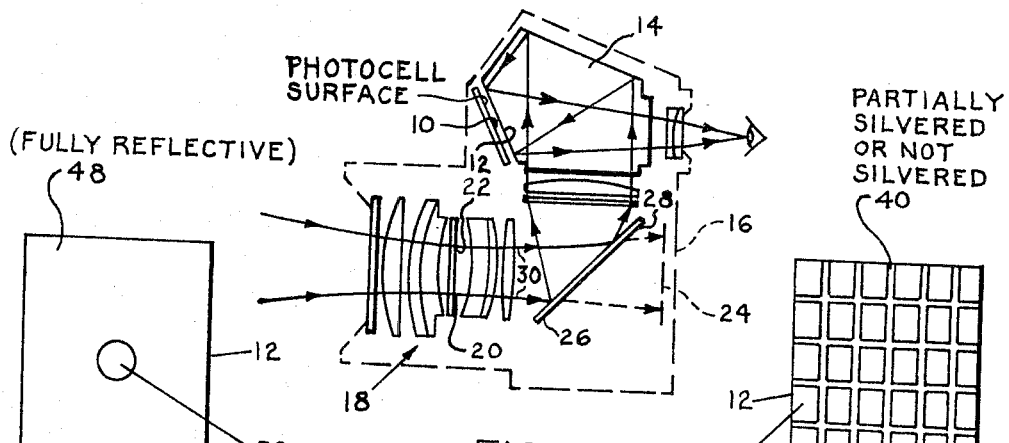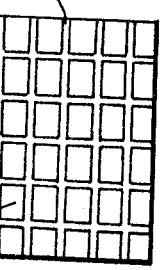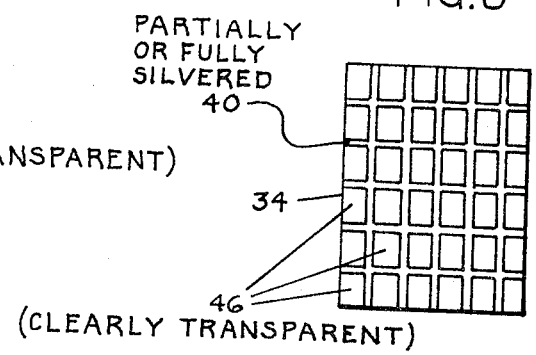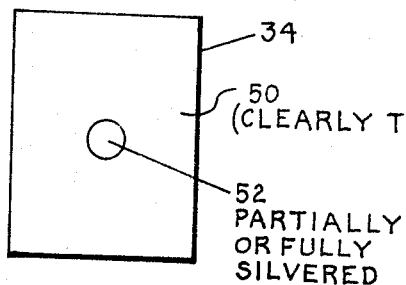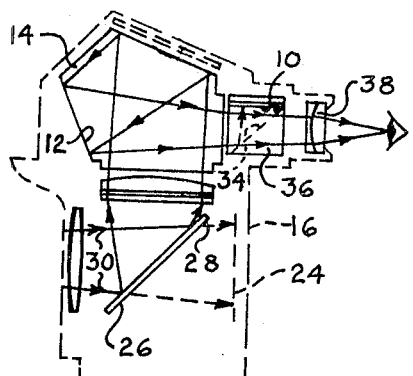

3,282,178
LIGHT METERING MEANS FOR CAMERAS
Noel R. Nelson, Takoma Park, Md.
(12813 Camellia Drive, Wheaton, Md.)
Filed Oct. 21, 1963, Ser. No. 317,420
7 Claims. (Cl. 95—10)

This invention relates to improved light metering means for single lens reflex and other cameras, and may be illustrated as an improvement of the light metering means disclosed in my prior Patent No. 3,060,823 issued October 30, 1962, on Precise Light Metering Means for Single Lens Reflex Cameras.

The object of this invention is to reduce the projected image brightness loss normally caused by semi-silvering the entire surface intercepting the viewing image beam for transmission or reflection of a substantial portion of the light in this beam to the photo-cell surface of the light metering means as illustrated e.g. in the above mentioned prior patent, FIG. 1 or 4 thereof respectively.

A further object is to reduce this loss by semi-silvering only a limited area of this surface, making the rest of it fully reflective or clearly transparent, as the case may be, for conveying more brightness to the image portion of the beam.

A further object is to form this limited area as a single spot for measuring the light intensity in the area of the field at which it is aimed, as determined by its projected location in the image.

A further object is to form this limited area as a grid extending over the entire surface to measure the average light intensity across the whole frame, without substantially losing any image brightness in any portion of the frame.

A further object is to decrease or increase the amount of silvering of the limited area of this surface to increase the intensity of the light transmitted or reflected, as the case may be, to the photo-cell surface in order to increase the sensitivity of the light metering means, without substantially reducing the image brightness.

Other and more specific objects will appear in the following detailed description of the invention as illustrated in the accompanying drawings, wherein:

FIG. 1 is a diagrammatic illustration of the adaptation of a possible photo-cell arrangement in combination with the pentaprism reflecting surfaces of a Japanese Nikon Model F single lens reflex camera, in which the improved light metering means is incorporated, FIG. 2 is a similar illustration of the adaptation of another possible arrangement in combination with the pentaprism viewer of the Japanese Nikon Model F having an additional beam splitting reflector prism for directing a portion of the viewer beam to the photo-cell outside the viewer path, in which combination the present improved light metering means is incorporated.

FIGS. 3 and 4 are front views of the partially reflective or partially transparent surfaces which may be used in the metering means of the two cameras illustrated in FIGS. 1 and 2 respectively, and FIGS. 5 and 6 show similar views of a modified form of the same surfaces, which may be used in these cameras when it is desired to measure light intensities in selected portions of the field of view smaller than the area covered by the entire beam in order to facilitate bringing out details in these areas at a sacrifice of details in other highly contrasting portions of the frame area.

The invention of my prior patent was particularly adapted for use with single-lens reflex cameras such as the Nikon Model F, the Exakta, the Asahi Pentax, and many other 35 mm. single-lens reflex cameras which feature interchangeable lenses of varying focal lengths and prism-type viewfinding systems.

It is well known that lenses of varying focal lengths have different cone angles. For example, the so-called normal focal length 50 mm. $f$ 1.4 Nikkor lenses has a cone angle of approximately 46°, at the long focal length extreme, the 500 mm. $f$ 5 Nikkor lens has a cone angle of approximately only 5°. The cone angles for intermediate focal length lenses logically range between these extremes.

It has been determined by experimentation that the angle of acceptance of the average photoelectric exposure meter is about 60°. This means that the average meter accepts light in about a 60° cone angle area (at least in the horizontal direction) and so meters the exposure from an area much wider than even the normal 50 mm. lens takes in. This presents certain obvious difficulties in determining proper and true exposure intelligence and these difficulties become progressively more pronounced when longer focal length lenses are used.

The invention of my prior patent avoids these difficulties by measuring the exposure from the area in substantially the same cone angle which is accepted by whatever lens is being used. The small unrestricted portion of the entire cross section of the beam passing through the lens from the entire subject area is intercepted and sampled by the photo-cell at the back of any unsilvered or partly silvered prism reflecting surface in the path of the beam on its way through the camera lens and viewfinder.

Any suitable reflecting surface in the viewer path may be selected in the single-lens reflex camera of any type, for this purpose, and the photo-cell either incorporated in this reflecting surface or placed adjacent or fixed directly to this surface, after removing any silver from a previously silvered surface, so as to receive substantially the entire cross section of the portion of the beam which is not reflected by said unsilvered surface but which normally is lost by passing through said surface. This normal loss is in proportion to the portion which is reflected, so that its measure indicates a precisely proportionate value of the entire light beam and of the average exposure over substantially the entire image area. Obviously, as mentioned in my prior patent, the reflecting surface could be partly silvered, in which case the normal loss would be reduced, but would still be proportional to the reflected portion, and therefore would maintain a precise relation to the value of the entire light beam, of which it would be a correct measure.

In my prior patent, mentioned above, the entire area (12 in FIG. 1 and 34 in FIG. 4 thereof) of the partially reflecting and partially transmitting surface is lightly silver-coated or backed by the partially absorbing photo-cell.

The present improvement substantially reduces the percentage of viewing-image-brightness loss sustained in using a portion of the light intensity across the entire image beam for the metering means, as disclosed in this prior patent, by using a portion or even all of the light intensity across only a minimum area of the beam resulting in much less loss of brightness in the image, yet retaining the same or increasing the sensitivity of the light metering means because the same portion or even more of the light intensity is directed to the photo-cell.

This minimum area of the image beam may be intercepted by semi-silvering only a small area of the partially reflecting and partially transmitting surface, leaving the rest of this surface fully reflective (12) or clearly transparent (34) for reflecting or transmitting the full intensity of the light across substantially the entire beam with a minimum of image brightness loss.

In FIG. 1 the photo-cell surface 10 is held adjacent to the outside of the reflecting surface 12 of the pentaprism 14. The silver coating on the outside of a small portion of this surface has been removed so that a definite but correspondingly small portion of the viewer light beam passes through the surface and is not reflected. The outline of the camera 16 is shown in dotted lines and the arrangement of the elements as used in the Japanese Nikon F camera are shown diagrammatically to illustrate the novel adaptation of the present invention. The lens system 18 has an automatic diaphragm 20 for controlling the aperture 22. The image exposure surface is indicated at 24. The mirror 26 is hinged at 28 and is raised to a horizontal position when making an exposure, during which the diaphragm is stopped down to the desired aperture. After an exposure the diaphragm is automatically opened and the mirror returned to the viewing position, as shown in FIG. 1.

The outline of the beam passing through the camera lens aperture and reflected through the viewer is indicated by the solid arrow lines 30. At the reflecting surface 12, the normally lost portion of the light beam which is not reflected, but which passes through the uncoated or lightly coated small portion of the surface 12, is intercepted by the photo-cell surface 10 to measure the intensity of the light beam from the subject source. The photo-cell surface 10 is suitably connected to a light meter (not shown) having an indicator scale graduated to indicate the intensity across the small area of the light beam, which is sampled by the photo-cell.

Another possible arrangement of the photo-cell in the Nikon Model F camera is shown in FIG. 2, where the silvered surface 12 may be left intact, and a semi-reflecting surface 34 introduced in a beam-splitting prism 36 between the pentaprism 14 and the viewer eyepiece 38, for reflecting a percentage or the entire intensity over a small portion of the area of the light beam up to the photo-cell surface 10.

Whether the photo-cell is mounted so as to receive a sample portion of the image light beam by transmission through a small area of a predominantly reflecting surface in the projection system, such as surface 12 in the projection system of FIG. 1, or by reflection from a small area of a predominantly transmitting surface, such as 34 in FIG. 2, the small area may be formed as a grid 40 of any criss-cross configurations or as spot 52 of round or any other shape. This small area may be partially silvered or not silvered at all in surface 12; and partially or fully silvered in surface 34; in accordance with the percentage of the intensity of the light it is desired to reach the photo-cell to give the light meter the desired sensitivity. The remaining areas 42 and 48 or 46 and 50 of the surfaces 12 or 34 respectively being fully reflective or clearly transparent to conserve the major portion of brightness of the beam to be delivered to the image.

Many other obvious modifications in the form and proportions of the parts may be made without departing from the spirit and scope of the present invention, as defined in the appended claims.

What is claimed is:

1. In a camera having a light metering means and an image viewing projection system,
   a partially reflecting and partially transmitting beam splitter surface in said system in the path of the image viewing projection, and adapted to divert a small sample portion of the light beam out of said path, said portion being of an intensity proportional to that of the light beam,
   said beam splitter surface having thereon a predominant reflective area of grid form which directs the major portion of said light beam in the path of the image viewing projection, and said beam splitter surface being located between the reflective grid areas which diverts a small portion of the light beam to a photocell, and
   a light meter photocell located outside of said path and mounted in a position to receive said small portion of the light beam which is transmitted by the beam splitter surface.

2. In a camera having a light metering means and an image viewing projection system,
   a partially reflecting and partially transmitting beam splitter surface in said system in the path of the image viewing projection, and adapted to divert a small sample portion of the light beam out of said path, said portion being of an intensity proportional to that of the light beam,
   said beam splitter surface being provided with a predominant transmitting area which directs the major portion of said light beam in the path of the image viewing projection, and said beam-splitter surface area which diverts a small sample portion of the light beam to a photocell, and
   a light meter photocell located outside of said path and mounted in a position to receive said small sample portion of the light beam which is reflected by the beam-splitter surface.

3. The combination defined in claim 2, said transmitting area being in the form of a grid across the entire surface to provide an average intensity metering over the entire beam by reflection from the small beam-splitting surface area.

4. The combination defined in claim 2, said beam-splitting area being in the form of a spot to provide a metering of the light intensity in a selected area of the field of view.

5. A single lens reflex camera having a viewfinder system including a beam-splitting prism having a reflective surface area formed thereon having a grid shape with sufficiently large beam-splitting surface areas between the reflective grid area for transmitting the major portion of the light beam to the image viewfinder, and a lightmeter having a stationary photo-cell mounted in front of said reflective grid area to intercept and measure the small portion of the entire light beam reflected by said beam-splitting surface and passing through said viewfinder system, whereby a precise measure of the average light intensity across the entire beam framed by the camera may be obtained simultaneously with the viewing operation with minimum loss of image brightness to the metering operation.

6. A single lens reflex camera having a viewfinder system for reflecting a framed image to a viewfinder screen corresponding to the image to be exposed on the exposure surface for which the camera is set, at least one prism beam-splitting element in said system having a partially transparent and partially reflecting surface area of grid form with a predominant transparent area to transmit the viewfinder image light, whereby to provide for the reflection of the small remaining area of grid form over the entire framed image beam, and a lightmeter having a stationary photo-cell surface mounted in front of said reflected portion of the beam to receive only said small reflected portion of said framed beam for a precise measurement of the average light intensity over the entire framed image for which the camera is set during the viewing operation.

7. A single lens reflex camera having a viewfinder system, a pentaprism having two fully reflecting surfaces in said viewfinder system, an eyepiece for said viewfinder back of said pentaprism, a beam-splitting prism with a 45° grid formed semi-reflecting surface between said pentaprism and said eyepiece, and a lightmeter having a photo-cell surface mounted on the side of said beam-splitting prism to receive the reflected portion of the entire framed image beam from said 45° grid formed semi-reflecting surface to measure the precise intensity of the entire framed exposure for which said camera is set, said grid formed reflecting surface comprising a small portion of the entire framed image area to provide maximum image brightness.

References Cited by the Examiner

UNITED STATES PATENTS

| | | | |
|---|---|---|---|
| 1,012,715 | 12/1911 | Saegmuller | 88—1 |
| 1,199,882 | 10/1916 | Frey | 88—1 |
| 1,451,774 | 4/1923 | Holbrook et al. | 88—1 |
| 2,909,109 | 10/1959 | Back | 95—42 |
| 3,060,823 | 10/1962 | Nelson | 95—10 |
| 3,130,634 | 4/1964 | Kropp et al. | 88—24 |
| 3,181,445 | 5/1965 | Reymond | 95—42 |
| 3,194,136 | 7/1965 | Ort | 95—10 |

NORTON ANSHER, *Primary Examiner.*

JOHN M. HORAN, *Examiner.*

J. F. PETER, Jr., *Assistant Examiner.*